UNITED STATES PATENT OFFICE.

RUDOLF E. HELLMUND, OF PITTSBURGH, PENNSYLVANIA, ASSIGNOR TO WESTINGHOUSE ELECTRIC AND MANUFACTURING COMPANY, A CORPORATION OF PENNSYLVANIA.

SYSTEM OF DISTRIBUTION AND CONTROL.

1,242,936.  Specification of Letters Patent.  Patented Oct. 16, 1917.

Application filed February 19, 1914. Serial No. 819,739.

*To all whom it may concern:*

Be it known that I, RUDOLF E. HELLMUND, a subject of the German Empire, and a resident of Pittsburgh, in the county of Allegheny and State of Pennsylvania, have invented a new and useful Improvement in Systems of Distribution and Control, of which the following is a specification.

My invention relates to alternating current single-phase distribution systems and to the control of polyphase induction motors adapted to be operated therefrom through the agency of a so-called phase converter.

The object of my invention is to provide automatic means for regulating the amount and phase position of the voltage delivered by a phase converter to a driving motor under varying load conditions.

Another object of my invention is to provide means adapted to be associated with certain of the windings of a phase converter and a driving motor, for automatically regulating the electrical characteristics of the converter secondary energy in response to variations in the load current.

Another object of my invention is to provide a single-phase alternating current commutator motor for starting a phase converter and bringing it up to normal speed, after which the armature and field magnet windings of the starting motor are associated with the respective independent circuits of the phase converter and driving motor for purposes of regulation.

In my copending application Serial No. 819,737, filed of even date herewith, I have disclosed a means for regulating the operation of phase converters under load conditions through the agency of the switching devices which are manually operated.

It is my present purpose to provide an automatic means for accomplishing the same result, and, moreover, to utilize the starting motor to attain the desired ends.

According to my present invention, I propose to excite the field of the starting motor from one phase of the converter, while the armature thereof is associated with the other phase, for the purpose of adding a correcting component to this second phase which shall vary automatically in accordance with the load and shall inherently compensate for changes in the converter secondary voltage and the phase position thereof.

Figure 1:
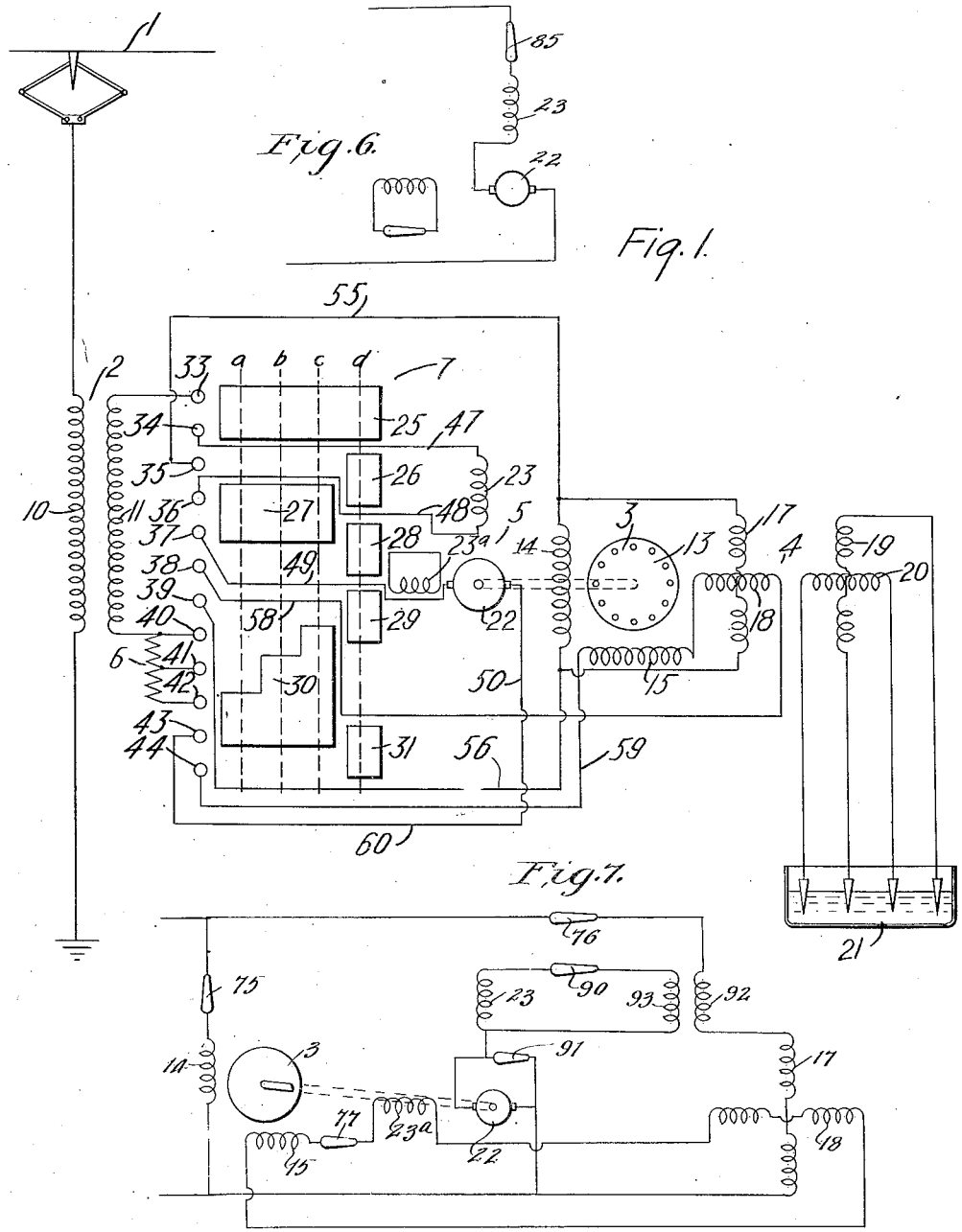
Figure 3:
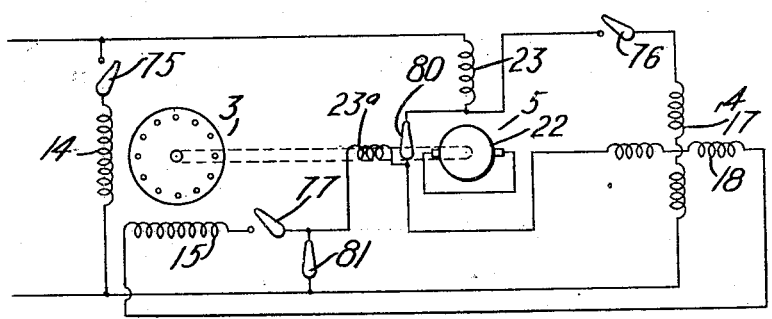
Figure 4:
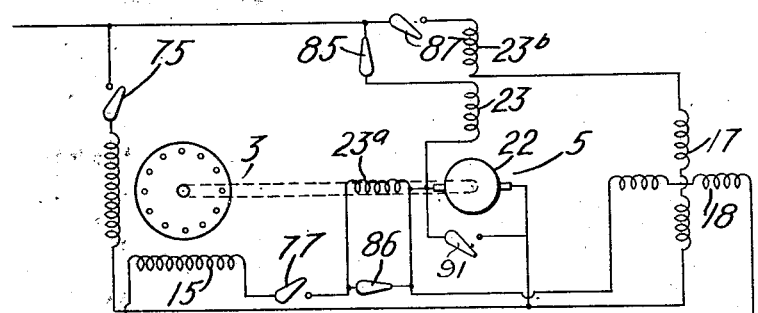
Figure 5:
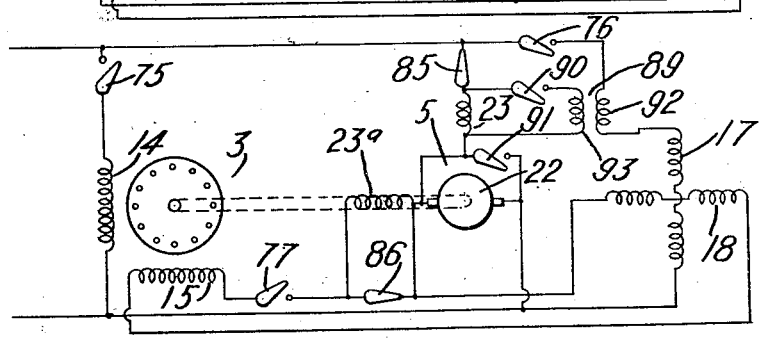

In the accompanying drawing, Figure 1 is a diagrammatic view of a combined system of distribution and control embodying my invention, Figs. 2, 3, 4 and 5 are simplified diagrammatic views of modified systems embodying my invention, and Fig. 6 and Fig. 7 are diagrammatic views of the circuits that are completed under predetermined conditions in the system of Fig. 5.

Referring to Fig. 1 of the drawing, the system shown, embodies a source of single phase energy 1, a transformer 2, a phase converter 3, a polyphase induction motor 4, a single-phase starting motor 5, a starting resistor 6 and a controller 7. The single phase source of energy 1 is adapted to excite a primary winding 10 of the transformer 2, the secondary winding 11 of which may be connected to the starting motor 5, or to the phase converter 3 and induction motor 4 by means of the controller 7.

The phase converter 3 may constitute a two-phase induction motor of the squirrel cage type, having a rotor 13, a primary exciting winding 14 and a secondary winding 15, the latter two windings being separated and electro-magnetically associated in quadrature relation in the usual manner.

The induction motor 4 may be of any suitable construction adapted for operation upon two-phase energy and is provided with a plurality of windings 17 and 18 which are located upon its stator and a plurality of windings 19 and 20 associated with its rotor and connected to a liquid rheostat 21. The starting motor 5 is of the single-phase commutator type and is provided with an armature 22, a field magnet winding 23 and an auxiliary compensating field magnet winding 23ᵃ. The armature 22 is mechanically connected to the rotor 13 of the converter 3.

The controller 7 is merely illustrative of any suitable device for effecting the connections desired, and, as shown, comprises a rotatable drum having contact members 25 to 31, inclusive, which are adapted to coöperate with a plurality of stationary contact terminals 33 to 44, inclusive, upon the position-indicating lines *a*, *b*, *c* and *d*.

Assuming the apparatus and connections to be as shown, the operation of the system is as follows: The controller 7 is first moved into position *a*, thereby completing a circuit from one terminal of the transformer winding 11 which includes contact terminal 33, conducting member 25, contact terminal 34, conductor 47, field magnet winding 23 of the starting motor 5, conductor 48, contact terminal 36, conducting member 27, contact terminal 37, conductor 49, armature 22 of the starting motor 5, conductor 50, contact terminals 43 and 40 which are bridged by conducting member 30 and resistor 6, to the other terminal of the transformer winding 11.

Thus, energy is supplied to the motor 5 and to start it into opertaion to drive the phase converter 3.

As controller 7 is moved into positions *b* and *c*, the several sections of the resistor 6 are successively excluded, and the starting motor 5 gradually brings the phase converter 3 up to normal running speed. Under these conditions, the controller 7 is moved into its position *d*, thereby disconnecting the starting motor 5 from the transformer winding 11, and establishing a circuit from one terminal of said winding which includes contact terminal 33, conducting member 25, contact terminal 34, conductor 47, field magnet winding 23 of the starting motor 5, conductor 48, contact terminal 36, conducting member 26, contact terminal 35 and conductor 55, where the circuit divides, one branch including the exciting winding 14 of the phase converter 3 and the other branch including winding 17 of the driving motor 4, and thence through conductor 56, contact terminal 39, conducting member 29, and contact terminal 40 to the other terminal of transformer winding 11. Concurrently with the establishment of the circuit just traced, another circuit is completed from one terminal of the starting motor armature 22 through conductor 49, contact terminal 37, conducting member 28, contact terminal 38, conductor 58, winding 18 of the driving motor 4, winding 15 of the converter 3, conductor 59, contact terminal 44, conducting member 31, contact terminal 43 and conductor 60 to the other terminal of the armature 22.

Having completed the circuits just traced, the starting motor field magnet winding 23 and its armature 22 are respectively connected into separate circuits which respectively include the converter winding 14 and motor winding 17, and the converter winding 15 and motor winding 18. Inasmuch as the voltage of the windings 14 and 17 is substantially in quadrature with that of the windings 15 and 18, the exciting voltage applied to the field magnet winding 23 of the starting motor 5, now employed as a regulator, will cause the armature 22 to deliver a voltage in quadrature to that of the secondary winding 15 of the converter 3.

Therefore, since the excitation of the single-phase commutator machine 5 varies with the load, it is clear that a variable out-of-phase correcting component of voltage is impressed upon the secondary converter circuit, which inherently and automatically regulates the converter characteristics with respect to the amount and phase position of the converter voltage under varying conditions of load.

In Figs. 2, 3, 4 and 5 I have illustrated modified forms of my invention by means of simplified diagrams of a portion of the main circuit connections, and have shown the necessary switches for effecting the desired connections. For the sake of simplicity and clearness, hand-operated switches are illustrated although it will be understood that, in actual operation, these switches will be embodied in a suitable controller or be electrically operated and governed by a suitable master controller.

Figure 2:
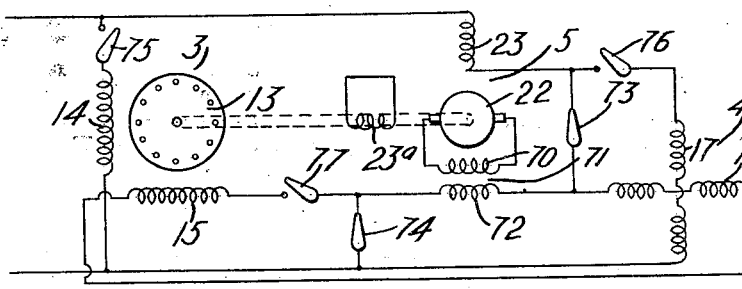

Referring to Fig. 2, the starting motor 5 is provided with an armature 22, a main field magnet winding 23 and an auxiliary field winding 23ª. The armature winding 22 is designed for a relatively low current-carrying capacity and is connected to a primary winding 70 of a transformer 71 having a secondary winding 72 which is adapted to be connected in the secondary converter circuit during normal operation. In this manner, the winding of the armature 22 is not required to carry full-load current as is necessitated with the starting motor shown in Fig. 1. The ratio of transformation between the primary winding 70 and secondary winding 72 of the transformer 71 is such as to provide a secondary winding adapted to handle the load current.

For starting, switches 73 and 74 are closed, thereby completing a circuit from the main transformer 2 which includes field magnet winding 23, switch 73, secondary transformer winding 72 and switch 74. Energy is thus supplied to the motor which starts into operation and is brought up to speed in a well-known manner, after which the switches 73 and 74 are opened and switches 75, 76 and 77 are closed. By so doing, the field magnet winding 23 is connected in circuit with winding 17 of the driving motor 4 and is excited in phase with said winding and winding 14 of the phase converter 3. The secondary converter winding 15, the transformer winding 72 and the driving motor winding 18 are connected in a local circuit.

Under load conditions, the exciting winding 23 of the starting motor 5 causes a voltage to be generated in the armature 22 in phase with that of the converter winding 14 and motor winding 17, and, this voltage is transformed, through the transformer 71, and impressed upon the secondary circuit which includes the converter winding 15 and motor winding 18. Thus, an out-of-phase correcting voltage which varies in accordance with the load and automatically compensates for voltage changes and phase distortion is introduced into the secondary converter circuit.

In Fig. 3, the starting motor 5 is so designed that its auxiliary winding 23ª may be employed in lieu of the transformer 71 shown in Fig. 2. In this form of my invention, the armature 22 is adapted for low current and is permanently short-circuited. A suitable transformer ratio is chosen between the armature 22 and auxiliary field magnet winding 23ª, whereby the starting motor 5, in itself, may accomplish the function of the separate transformer 71 shown in Fig. 2.

In starting, switches 80 and 81 are closed, thereby establishing a circuit which includes the field magnet winding 23, switch 80, auxiliary field magnet winding 23ª and switch 81. The armature 22, being short-circuited and energy being supplied to the field magnet winding 23 and 23ª, the motor 5 is brought up to speed as a repulsion motor in accordance with well-known principles.

Having attained full running speed, switches 80 and 81 are opened, and switches 75, 76 and 77 are closed to establish circuits similar to those described with respect to the system shown in Fig. 2, except that the auxiliary field magnet winding 23ª is employed in place of the transformer winding 72.

Reference may now be had to Fig. 4, in which the starting motor 5 is provided with a plurality of main field windings 23 and 23ᵇ and an auxiliary field magnet winding 23ª. One of the main field magnet windings 23 is designed to meet starting conditions, while the other winding 23ᵇ is intended for regulation. The motor 5 is started by closing switches 85 and 86, thus connecting the starting winding 23 in series with the armature 22, while short-circuiting the auxiliary field winding 23ª. Having brought the motor 5 up to normal running speed, switches 85 and 86 are open and switches 75, 87, 91 and 77 are closed. The regulating winding 23ᵇ is thus connected in circuit with the driving motor winding 17, while auxiliary winding 23ª is connected in the secondary circuit which includes the converter winding 15 and motor winding 18. Moreover, the armature 22 is short-circuited by switch 91.

Referring now to Fig. 5, the starting motor 5 is provided with a single main field magnet winding 23 which is normally adapted to meet the starting requirements, but which may be energized by means of an auxiliary transformer 89, in accordance with load conditions, for purposes of regulation. For starting, switches 85 and 86 are closed to establish connections through switch 85, field magnet winding 23 and armature 22 and to short-circuit the auxiliary field winding 23ª. The starting motor 5 may thus be operated, and normal running speed conditions obtained.

For purposes of regulation, switches 85 and 86 are opened and switches 75, 76, 90, 91 and 77 are closed. Upon the closure of the switches recited, a primary winding 92 of the transformer 89 is connected in circuit with the driving motor winding 17 and is excited in phase with said winding and the converter winding 14. Inasmuch as the secondary transformer winding 93 is connected across the field magnet winding 23, said field magnet winding is energized in accordance with load conditions and is adapted for normal operation. Furthermore, the armature 22 is short-circuited through switch 91, while the auxiliary field magnet winding 23ª is connected into the secondary circuit which includes converter winding 15 and motor winding 18.

In all of the systems shown in Figs. 2, 3, 4 and 5 the starting motor 5 is adapted to effect automatic regulation under operating conditions and in accordance with the variations in load. Moreover, the main field magnet winding of the starting motor is connected either conductively or inductively in series relation with one phase of the driving motor 4, while the armature of the starting motor is associated, either directly or indirectly, with the other phase of said converter and said driving motor. Thus, an out-of-phase correcting component of voltage is introduced into the secondary converter circuit which varies in accordance with the load and which, therefore, automatically regulates the operation of the converter and maintains its voltage at its proper amount and phase position.

Although I have shown and described my invention in connection with special arrangements of connections and apparatus, and particular types of dynamo-electric machines, those skilled in the art will readily understand that my invention is not necessarily restricted to the specific means and connections shown, and I desire that only such limitations shall be imposed as are indicated in the appended claims.

I claim as my invention:

1. The combination with a source of energy, a phase converter and a dynamo-electric machine adapted to receive energy from said converter, of auxiliary dynamo-electric means partially dependent upon load conditions of said first dynamo-electric machine for alone varying the amount and phase position of the delivered converter voltage.

2. The combination with a source of energy, a phase converter and a dynamo-electric machine adapted to receive energy from said converter, of an auxiliary dynamo-electric machine having its component windings connected to different circuits of said first dynamo-electric machine for alone regulating its operation.

3. The combination with a source of energy, a polyphase converter and a dynamo-electric machine adapted to receive energy from said converter, of a single-phase dynamo-electric machine having an armature and field magnet winding respectively connected with different circuits of said first dynamo-electric machine.

4. The combination with a source of energy, a polyphase converter having certain windings connected to said source and other windings separate therefrom and operatively related to said first windings, and a dynamo-electric machine having certain windings connected in multiple to said first converter windings and other windings connected in series with the second converter windings, of a single-phase dynamo-electric machine having armature and field magnet windings respectively connected with the several windings of said first machine.

5. The combination with a source of energy, a phase converter and a dynamo-electric machine adapted to receive energy from said phase converter, of means for starting said converter, and means for employing said starting means to regulate the characteristics of said phase converter under operating conditions.

6. The combination with a source of energy, a polyphase converter having independent phase windings, and a dynamo-electric machine adapted to receive energy from said converter, of an auxiliary dynamo-electric machine having armature and field windings respectively connected to the windings of said first dynamo-electric machine.

7. The combination with a source of energy, a phase converter and a dynamo-electric machine adapted to receive energy from said phase converter, of auxiliary dynamo-electric means dependent upon load conditions for alone regulating the operating characteristics of said converter.

8. The combination with a source of energy, a phase converter and a dynamo-electric machine adapted to receive energy from said phase converter, of auxiliary dynamo-electric automatic means for alone automatically varying the amount and phase position of the converter voltage under varying load conditions.

9. The combination with a source of energy, a phase converter and a dynamo-electric machine adapted to receive energy from said phase converter, of auxiliary dynamo-electric means for alone automatically compensating for the phase distortion of said converter under varying load conditions.

10. The combination with a source of energy, a phase converter and a dynamo-electric-machine adapted to receive energy from said phase converter, of a motor for starting said phase converter, and means for connecting said starting motor in circuit with said converter under normal operating conditions.

11. The combination with a source of energy, a phase converter and a dynamo-electric machine adapted to receive energy from said phase converter, of a motor for starting said phase converter, and means for electrically associating said starting motor with said converter under full-speed conditions, to effect predetermined regulation of said converter.

12. The combination with a source of energy, a polyphase converter and a driving motor, of an alternating-current commutator machine mechanically associated with said converter and having an armature, a normally short-circuited auxiliary field-magnet winding and a main field-magnet winding, means for connecting said armature and said main field winding in series for starting, a transformer having one winding connected in circuit with one phase of said driving motor for exciting said main field winding, and means for short-circuiting said armature and connecting said auxiliary field winding in circuit with the other phase of said converter under operating conditions.

13. The combination with a source of energy, a phase-converter and a dynamo-electric machine mechanically coupled with said converter and having an armature and a field winding, of means for initially employing said dynamo-electric machine to bring said converter up to speed, and means for subsequently utilizing said machine for purposes of regulation with said armature and field winding connected to different circuits of said dynamo-electric machine.

14. The combination with a source of energy, a phase converter and a driving motor, of an alternating-current commutator machine associated with said phase converter and having an armature, an auxiliary field winding adapted to be short-circuited and a main field winding, and means for connecting said armature and said main field winding in series for starting, and for connecting said main field winding in circuit with one phase of said driving motor and the auxiliary field winding in the other phase thereof for running.

15. The combination with a source of energy, a polyphase converter and a dynamo-electric machine, of an alternating-current commutator machine mechanically associated with said converter and having an armature, a normally short-circuited auxiliary field-magnet winding and a main field-magnet winding, means for connecting said machine to operate as a single-phase motor for starting said converter, and means for short-circuiting said armature, connecting said auxiliary field in circuit with one phase of said converter and for influencing the main field winding from the other phase of said dynamo-electric machine.

16. A balanced phase converter system comprising a phase converter, a circuit for supplying current of one phase to the converter, a circuit for delivering current of a different phase to the load, one of the circuits comprising three or more branches, and a series excited generator connected in a plurality of the branches for balancing the voltages between the branches throughout variation in load.

17. A balanced phase converter system comprising a phase converter for converting current of one phase into current of different phase, a polyphase circuit having a plurality of branches connected to the converter, a generator connected in one of the branches for balancing the electro-motive forces in the branches, and means for producing in the field of the generator a magnetomotive force approximately proportional to and in quadrature with the current in the generator branch.

18. A balanced phase converter system comprising a phase converter for converting current of one phase into current of different phase, a polyphase circuit having a plurality of branches connected to the converter, a generator having its armature connected in one of the branches for balancing the electromotive forces in the branches, and means for producing in the field of the generator a magnetomotive force approximately proportional to and in quadrature with the current in the generator branch.

19. A balanced phase-converter system comprising means for converting current of one phase into polyphase current of a different phase, a branched circuit for conducting the polyphase current from the converter, and coils in a plurality of branches inductively connected together for maintaining balanced phase relations and voltage conditions in the polyphase circuit.

20. A balanced phase-converter system comprising a phase converter, a circuit for supplying current of one phase to the converter, and a circuit for delivering current of a different phase to the load, one of the circuits comprising three or more branches, and means for inductively relating a plurality of the branches whereby the voltages between the branches may be equalized throughout variation in load.

In testimony whereof, I have hereunto subscribed my name this 14th day of Feb., 1914.

RUDOLF E. HELLMUND.

Witnesses:
B. B. HINES,
M. C. METZ.